US010768845B2

(12) United States Patent
Matsumoto

(10) Patent No.: US 10,768,845 B2
(45) Date of Patent: Sep. 8, 2020

(54) STORAGE DEVICE AND DATA OUTPUT METHOD FOR STORAGE DEVICE

(71) Applicant: BUFFALO, INC., Nagoya-shi (JP)

(72) Inventor: Naoki Matsumoto, Nagoya (JP)

(73) Assignee: BUFFALO, INC., Nagoya (JP)

( * ) Notice: Subject to any disclaimer, the term of this patent is extended or adjusted under 35 U.S.C. 154(b) by 9 days.

(21) Appl. No.: 15/878,204

(22) Filed: Jan. 23, 2018

(65) Prior Publication Data
US 2018/0210673 A1 Jul. 26, 2018

(30) Foreign Application Priority Data

Jan. 26, 2017 (JP) .................................. 2017-012226

(51) Int. Cl.
G06F 12/00 (2006.01)
G06F 3/06 (2006.01)
(52) U.S. Cl.
CPC ............ *G06F 3/0646* (2013.01); *G06F 3/061* (2013.01); *G06F 3/0605* (2013.01); *G06F 3/067* (2013.01); *G06F 3/0661* (2013.01); *G06F 3/0674* (2013.01); *G06F 12/00* (2013.01)
(58) Field of Classification Search
CPC ...................................................... G06F 12/00
USPC .......................................................... 711/154
See application file for complete search history.

(56) References Cited

U.S. PATENT DOCUMENTS

2002/0103952 A1* 8/2002 Thompson ............ G06F 9/4411 710/104
2002/0133694 A1* 9/2002 Ray ....................... G06F 9/4411 713/1

(Continued)

FOREIGN PATENT DOCUMENTS

JP 2008-047196 A 2/2008
JP 2015-207327 A 11/2015

OTHER PUBLICATIONS

*Fidata*, "The ultimate in audio quality, from a brand that lives up to the meaning of its name: "reliability"" Date of printout from *fidata* website: Jan. 17, 2018, http://www.iodata.jp/fidata/index.htm?p=ja (submitted with English version, http://www.iodata.jp/fidata/en/).

(Continued)

*Primary Examiner* — Gautam Sain
(74) *Attorney, Agent, or Firm* — Xsensus LLP

(57) ABSTRACT

A storage device includes a storage retaining content data, an input receiving instructions to reproduce the content data stored in the storage and a reproducer outputting the content data to an external reproducing device. The storage retains a table including identification information of the external reproducing device and a data format of the content data reproducible in the external reproducing device. The reproducer includes a notifier notifying reproduction information necessary for the external reproducing device to reproduce the content data before the content data are outputted to the external reproducing device in response to a reproduction instruction, and a data controller acquiring unique identification information for the external reproducing device when the external reproducing device is connected to the storage device and converting the content data into the data format reproducible in the external reproducing device and outputting the content data thereto.

19 Claims, 10 Drawing Sheets

(56) References Cited

U.S. PATENT DOCUMENTS

| | | | |
|---|---|---|---|
| 2010/0042580 A1* | 2/2010 | Cheng | G06F 16/00 |
| | | | 707/781 |
| 2010/0177612 A1* | 7/2010 | Shimizu | G11B 20/00086 |
| | | | 369/53.21 |
| 2016/0086611 A1* | 3/2016 | Tachimori | G06F 3/16 |
| | | | 704/500 |

OTHER PUBLICATIONS

Universal Serial Bus, "*USB-IF Announces USB Audio Device Class 3.0 Specification, USB Audio over USB Type-C™ offers a standardized solution for all digital audio applications*" Sep. 27, 2016, USB Implementers Forum, 2 pages, http://www.usb.org/press/USB-IF_Press_Release/USB_Audio_Specification_USB-IF_September_2016_FINAL.pdf.

\* cited by examiner

*FIG. 5*

| SETTING TABLE | 33 |
|---|---|
| USB-ID | DSD REPRODUCTION ABILITY |
| XX00-00XX | NO |
| XXAB-XXCD | DoP |
| EFXX-ABXX | Native |

33a  33b

STORAGE DEVICE AND DATA OUTPUT METHOD FOR STORAGE DEVICE

CROSS-REFERENCE TO RELATED APPLICATION

This application claims priority from Japanese Patent Application No. 2017-012226 filed on Jan. 26, 2017, the entire subject-matter of which is incorporated herein by reference.

BACKGROUND

The disclosure relates to a storage device for storing content data and a data output method for the storage device.

There is known a music data reproducing technology using a configuration in which a storage device retaining music data is connected to a Digital to Analog Converter (DAC) and the DAC is connected to a reproducing device. Music data are digital content data which are signals having a Direct Stream Digital (DSD) format or the like. As an example of such a storage device, there is known a storage device configured to have a port based on a Universal Serial Bus (USB) standard and output music data through a USB-DAC which is a kind of DAC connectable to the USB port (see, for example, fidata for the ultimate in audio quality, from a brand that lives up to the meaning of its name: "reliability" on the Internet URL http://www.iodata.jp/fidata/index.htm).

In the case of outputting music data having the DSD format through the USB port, the previous USB standard has no standard for outputting music data having the DSD format. Therefore, the storage device outputs music data having the DSD format based on a standard called DSD Audio over PCM flames (DoP) via the USB port in compliance with a Pulse Code Modulation (PCM) data format defined in the USB standard.

Recently, the USB-IF (USB Implements Forum) announced a new standard for audio output (see USB_Audio_Specification_USB-IF_ September_2016_FINAL <URL:http://www.usb.org/press/USB-IF_ Press_Releases/USB_Audio_Specification_USB-IF_ September_2016_ FINAL.pdf>). According to this standard, when a USB-DAC accesses (negotiates with) the storage device, if the USB-DAC declares that it can convert music data having the DSD format directly into analog data, the storage device can transmit music data having the DSD format to the USB-DAC, without converting the format (hereinafter, this system will also be referred to as the DSD native system). For USB-DACs produced before the announcement of the new standard, the storage device still needs to output music data having DoP format or PCM format through the USB port.

As described above, in the case of outputting music data to a USB-DAC connected to the USB port, the storage device needs to grasp which format of music data the USB-DAC can reproduce, in advance, and output the music data without converting the format or after converting the music data into a format which the USB-DAC can perform digital-to-analog conversion on.

For this reason, whenever connecting a USB-DAC to the USB port of the storage device, a user of the storage device needs to manually set which format of music data the connected USB-DAC can reproduce.

However, this manual setting is cumbersome. In the case of purchasing a new USB-DAC and connecting the USB-DAC to the storage device, the user needs to examine which format of music data the USB-DAC can reproduce, in advance. Therefore, such setting takes a long time.

Also, a technology for configuring a content transmitting device to have information on a format reproducible in a portable player and making the content transmitting device convert contents into the format reproducible in the portable player and transmit the contents to the portable player if the portable player is connected to the content transmitting device was proposed (see Japanese Patent Application Laid-Open No. 2008-47196 for instance). According to this technology, if the content transmitting device transmits a content, the portable player recognizes the format of the content for itself, and reproduces the content.

Meanwhile, in general, USB-DACs as described above do not have the function of recognizing the formats of music data outputted from storage devices, so they covert music data outputted from storage devices into analog data on the assumption that the music data have a predetermined format. Therefore, in the case where such a USB-DAC receives music data having a format different from the predetermined format, conversion into analog data cannot be appropriately performed. Therefore, it is difficult to apply the above-described technology to USB-DACs.

SUMMARY

According to one illustrative aspect of the disclosure, there is provided a storage device comprising: a storage configured to retain content data; an input configured to receive instructions to reproduce the content data stored in the storage; and a reproducer configured to output the content data to an external reproducing device according to reproduction instructions received by the input. The storage may retain a table including identification information of the external reproducing device and a data format of the content data reproducible in the external reproducing device in association with each other. The reproducer may include: a notifier configured to notify reproduction information necessary for the external reproducing device to reproduce the content data before the content data are outputted to the external reproducing device in response to reception of a reproduction instruction by the input; and a data controller configured to acquire unique identification information for the external reproducing device when the external reproducing device is connected to the storage device, convert the content data into the data format reproducible in the external reproducing device by referring to the table, and output the content data to the external reproducing device.

According to this configuration, it is possible to output, to an external reproducing device, content data having a data format reproducible in the external reproducing device.

According to another illustrative aspect of the disclosure, there may be provided a data output method for a storage device having a storage configured to retain content data, an input configured to receive instructions to reproduce the content data stored in the storage, a reproducer configured to output the content data to an external reproducing device according to reproduction instructions received by the input, and a table including identification information of the external reproducing device and a data format of the content data reproducible in the external reproducing device in association with each other. The reproducer may be further configured to: notify reproduction information necessary for the external reproducing device to reproduce the content data before the content data are outputted to the external reproducing device in response to reception of a reproduction instruction by the input; and aquire unique identification information for the external reproducing device when the external reproducing device is connected to the storage device, convert the content data into the data format reproducible in the external reproducing device by referring the table, and output the content data to the external reproducing device.

According to still another illustrative aspect of the disclosure, there may be provided a reproduction process device comprising: a storage; an input configured to receive an instruction to reproduce content data; a reproducer configured to output the content data to an external reproducing device according to the reproduction instruction received by the input; and a communicator configured to communicate with an external server through a network. The external server may have a table including identification information of the external reproducing device and a data format of the content data reproducible in the external reproducing device in association with each other. The reproducer may include: a notifier configured to notify reproduction information necessary for the external reproducing device to reproduce the content data before the content data are outputted to the external reproducing device in response to reception of the reproduction instruction by the input; and a data controller configured to acquire unique identification information for the external reproducing device when the external reproducing device is connected to the reproduction process device, and convert the content data into the data format reproducible in the external reproducing device by referring to the table stored in the external server through the communicator, and output the content data to the external reproducing device.

According to this configuration, it is possible to provide a storage device and a data output method and program for the storage device capable of easily outputting content data having a format appropriate for an external reproducing device connected to the storage device.

BRIEF DESCRIPTION OF DRAWINGS

FIG. 5 illustrates a setting table applicable to the storage device according to the first illustrative embodiment;

DETAILED DESCRIPTION

The disclosure has been made in view of the above circumstances and provides a storage device and a data output method and program for the storage device capable of easily outputting content data having a format appropriate for an external reproducing device connected to the storage device.

Hereinafter, illustrative embodiments of a storage device of the disclosure will be described with reference to the accompanying drawings.

First Illustrative Embodiment

Figure 1:
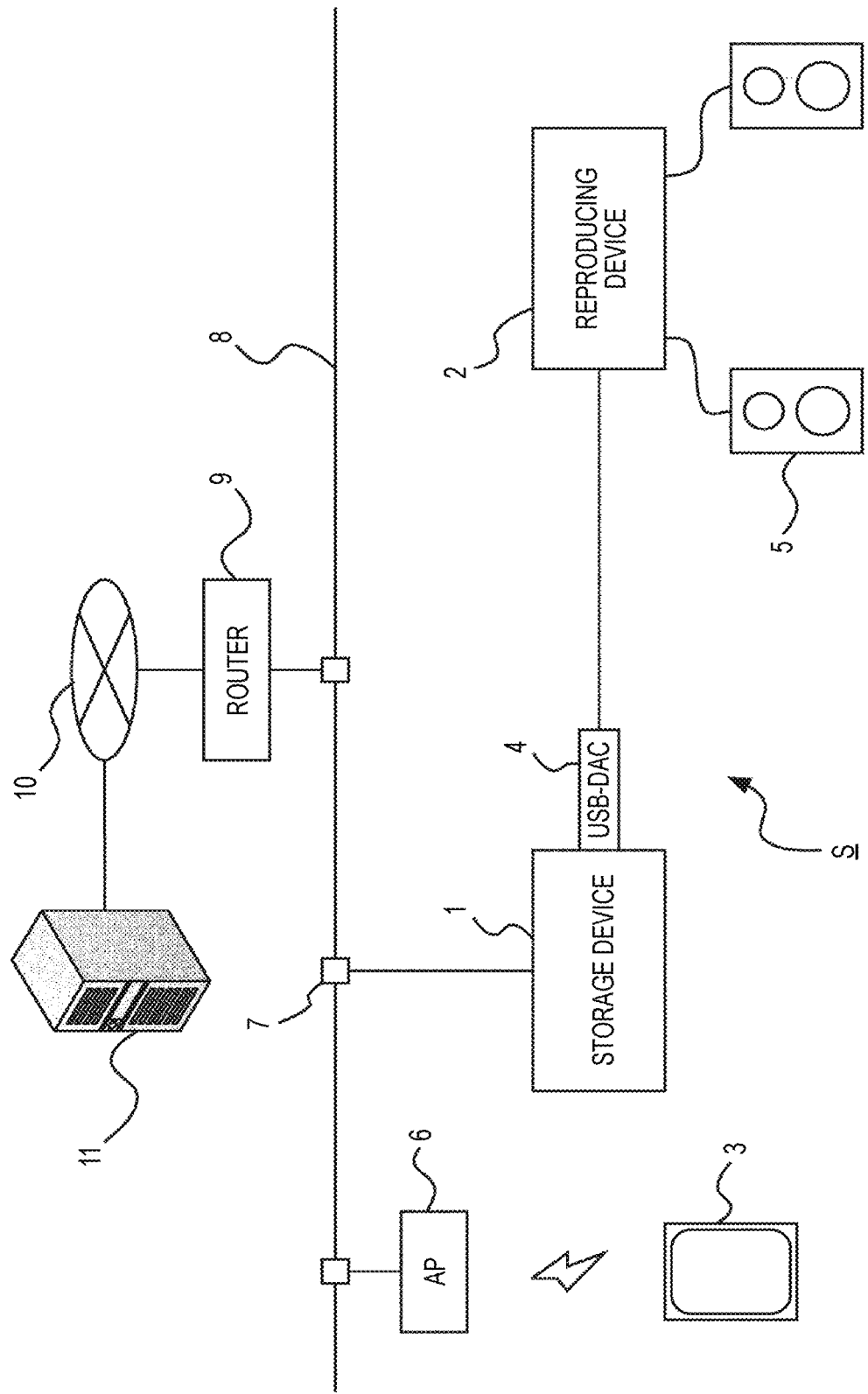
FIG. 1 is a general view of a content reproducing system including a storage device according to a first embodiment of the disclosure.

FIG. 1 shows a general view of a content reproducing system which is a first illustrative embodiment of the disclosure. In FIG. 1, a content reproducing system S of the first illustrative embodiment includes a storage device 1, a reproducing device 2, and a communication device 3.

The storage device 1 includes a storage retaining content data, an input unit (one example of an input) configured to receive instructions to reproduce the content data stored in the storage, and a transmitting unit configured to transmit the content data based on reproduction instructions received by the input unit, as will be described below in detail. The storage device 1 is, for example, a Network Attached Storage (NAS) or a Personal Computer (PC).

The storage device 1 of the present illustrative embodiment has a USB connector (not shown in FIG. 1) to which a USB-DAC 4 is connected, and the content data stored in the storage of the storage device 1 is outputted to the USB-DAC 4 through the USB connector. In the USB-DAC 4, the content data which is digital data is converted into analog data. This analog data is outputted, as analog content data reproducible in the reproducing device 2, to the reproducing device 2. Details of the storage device 1 will be described below.

The following description will be made with music data taken as an example of content data. However, the content data which can be stored in the storage device of the disclosure are not limited to music data and may be video data and still image data. Also, in the disclosure, the content data are stored as content files in the storage as will be described below. Therefore, the content data and the content files are interpreted synonymously unless they are specifically distinguished.

The reproducing device 2 receives analog content data from the USB-DAC 4. The reproducing device 2 transmits sound reproduction signals to a sound output device 5 such as a speaker on the basis of the analog content data. The content data are reproduced by the sound output device 5. The reproducing device 2 is, for example, an analog audio amplifier. Details of the reproducing device 2 also will be described below.

The communication device 3 is a device capable of wireless communication with a wireless Access Point (AP) 6. Examples of the communication device 3 include smart phones and tablet terminals.

The storage device 1 is connected to a Local Area Network (LAN) 8 via a relay device 7 such as a switching hub, and the communication device 3 is connected to the LAN 8 via the wireless access point 6 and the relay device 7. The LAN 8 is connected to a Wide Area Network (WAN) 10 such as the Internet via a router 9. Therefore, the storage device 1 and the communication device 3 can perform data communication with each other, and the storage device 1 and the communication device 3 can also perform data communication with an external server 11 existing on the WAN 10.

(Configuration of Storage Device of First Illustrative Embodiment)

Figure 2:
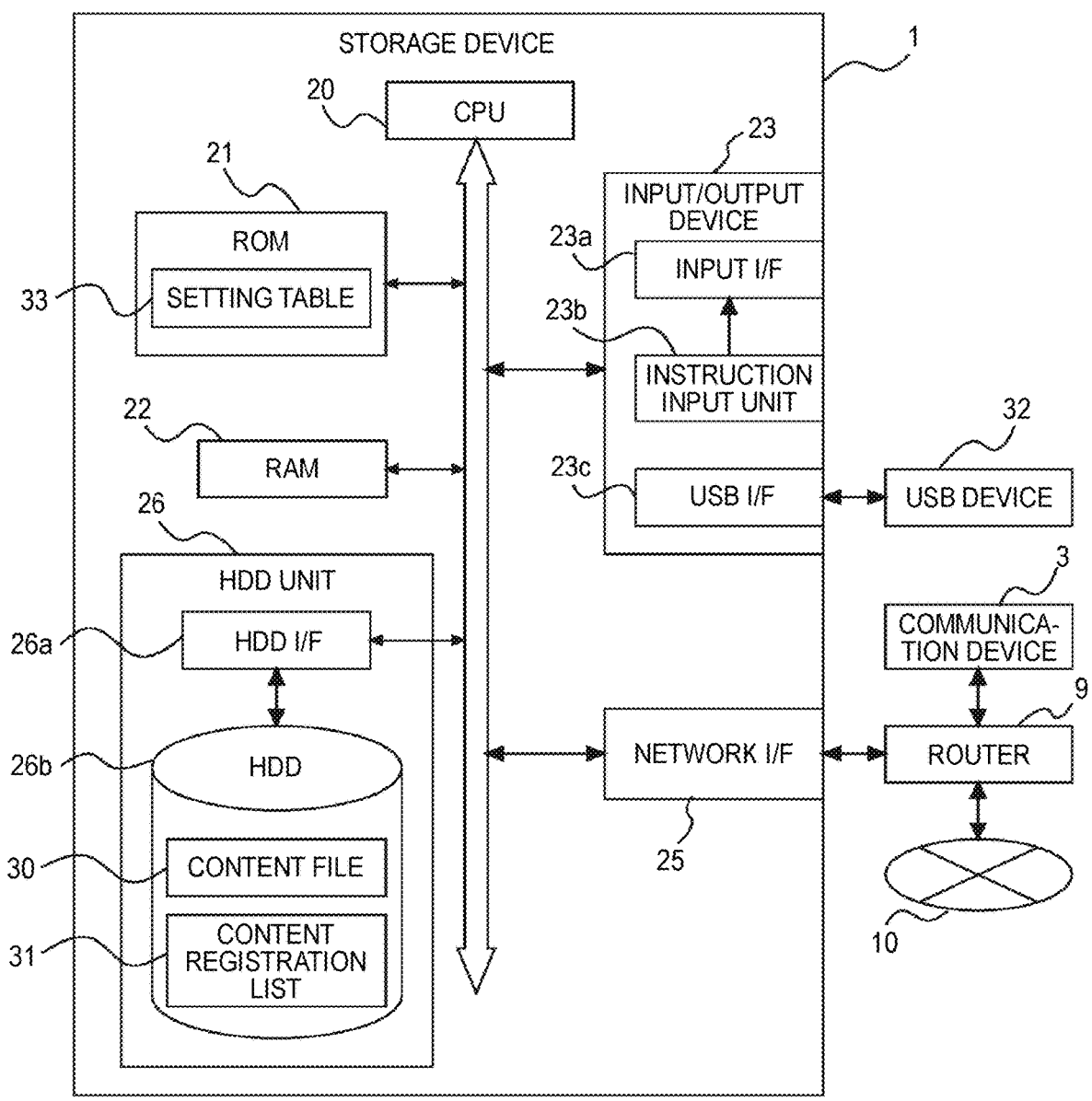
FIG. 2 is a general block diagram of the storage device according to the first illustrative embodiment.

FIG. 2 is a block diagram of the storage device 1 according to the first illustrative embodiment of the disclosure. In FIG. 2, the storage device 1 of the present illustrative embodiment includes a Central Processing Unit (CPU) 20, a Read Only Memory (ROM) 21, a Random Access Memory (RAM) 22, an input/output device 23, a network interface (I/F) 25, and a Hard Disk Drive (HDD) unit 26, and these components are connected to one another a bus.

Figure 4:
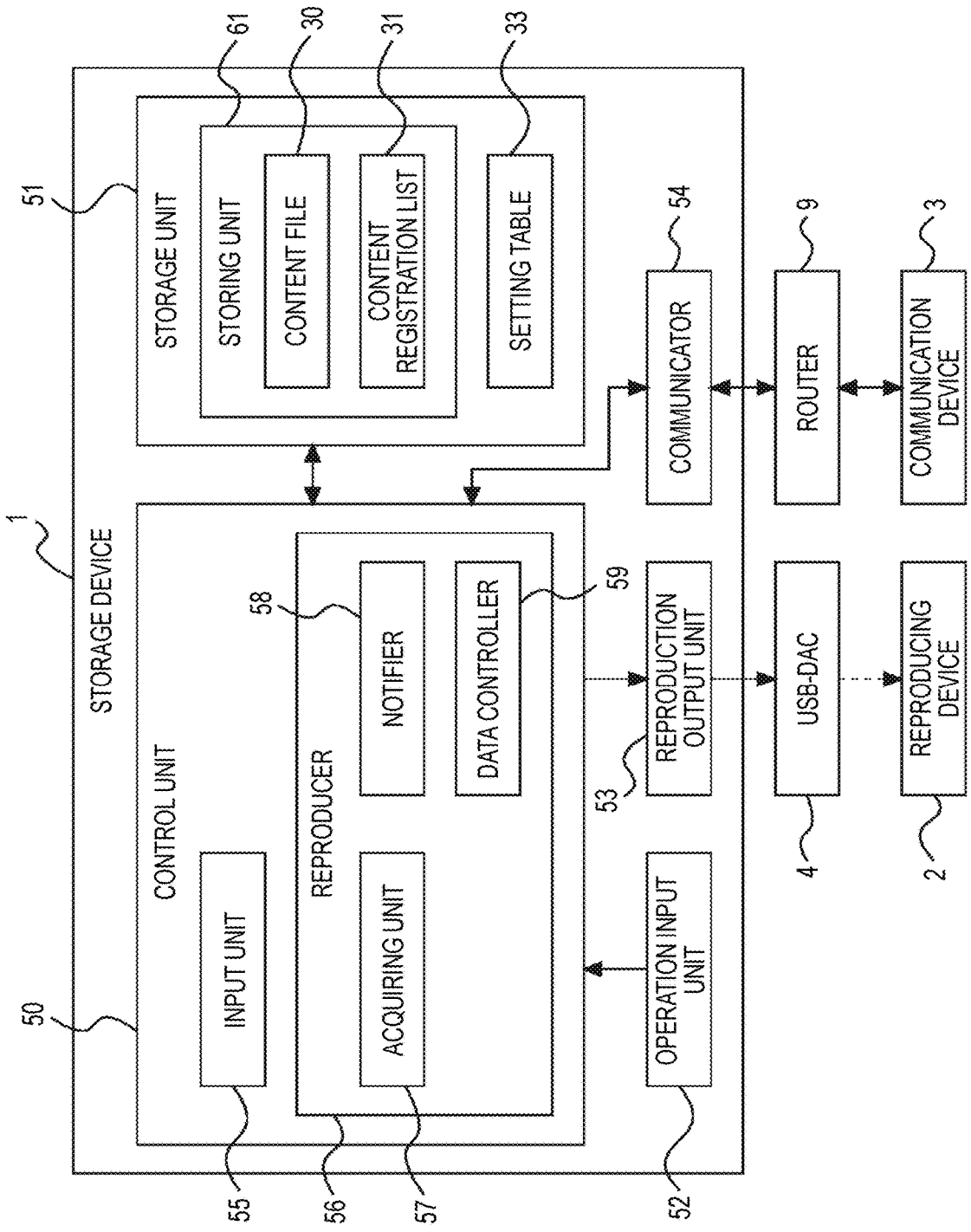
FIG. 4 is a functional block diagram of the storage device according to the first illustrative embodiment.

The CPU 20 controls the whole of the storage device 1 by executing programs such as firmware stored in the ROM 21 (described below). Also, the CPU 20 operates as each of function units as shown in FIG. 4, by executing programs stored in the ROM 21. Operations of the individual function units shown in FIG. 4 will be described below. In the ROM 21, the above described programs such as firmware, a setting table 33, and so on are stored in advance. The specific configuration of the setting table 33 will be described below. The RAM 22 serves as a work memory in the storage device 1. Programs, data, and the like which are temporarily usable when the storage device 1 including the CPU 20 operates are stored in the RAM 22.

The input/output device 23 includes an input interface (I/F) 23a, an instruction input unit 23b, and a USB interface (I/F) 23c.

The input interface 23a is connected to the instruction input unit 23b, and the input interface 23a receives an input signal based on a user's operation on the instruction input unit 23b. In the case where the storage device 1 is NAS, the instruction input unit 23b may include various buttons for issuing various instructions such as a file acquisition instruction, an external-reproducing-device removal instruction, an operation state display instruction, and a storage device reset instruction.

The USB interface 23c has a USB connector (not shown), and a USB device 32 is connected to the USB connector directly or via USB cables. According to the standard of USB 2.0 or USB 3.0, data is read out from or written into the USB device 32. Examples of the USB device 32 include the above-described USB-DAC 4, a USB flash memory, an HDD device having a USB interface, a keyboard, and so on.

The network interface 25 has a network connector (not shown), and the router 9 is connected to that network connector via a network cable (not shown). As a result, the storage device 1 and the communication device 3 can perform data communication with each other through the network interface 25 and the router 9, and if the router 9 is connected to the WAN 10, the storage device 1 can perform data communication with external networks. The network interface 25 can be used to perform wired communication based on, for example, the standard of 802.3 of the Institute of Electrical and Electronics Engineers (IEEE).

The HDD unit 26 includes an HDD 26b and an HDD interface (I/F) 26a. The HDD 26b includes a disk (not shown) which is a recording medium, a rotator (not shown) for rotating the disk, and a head unit (not shown) for writing data on the disk or reading data out of the disk. If receiving a command to write data on the HDD 26b or read data out of the HDD, the HDD interface 26a controls the whole of the HDD 26b while performing data write or read control. If any data is read, the HDD interface outputs the read data.

Also, in the HDD 26b, content files 30 and a content registration list 31 are stored in advance. In the HDD 26b of the present illustrative embodiment, content files 30 of one or more formats including DSD (Direct Stream Digital) format are stored in advance.

Here, the DSD format means the format of content files 30 obtained by converting analog music data into digital data by PDM (Pulse Density Modulation) which is a form of pulse modulation. Beside content files having the DSD format, content files 30 obtained by converting analog music data into digital data having the PCM format or the like by PCM (Pulse Code Modulation) may be stored in the HDD 26b. Specifically, it is preferable that content files 30 having the DSD format according to the present illustrative embodiment be files obtained by performing pulse modulation at sampling frequencies of 2.8224 MHz (also referred to as DSD64) which is 64 times 44.1 kHz which is the CD-DA (Compact Disc Digital Audio) sampling frequency, 5.6448 MHz (also referred to as DSD128) which is 128 times 44.1 kHz, and 11.2896 MHz (also referred to as DSD256) which is 256 times 44.1 kHz.

Also, in FIG. 2, only one content file 30 is shown. However, in the present illustrative embodiment, a plurality of content files 30 may be stored in the HDD 26b.

(Functional Components of Storage Device of First Illustrative Embodiment)

Figure 3:
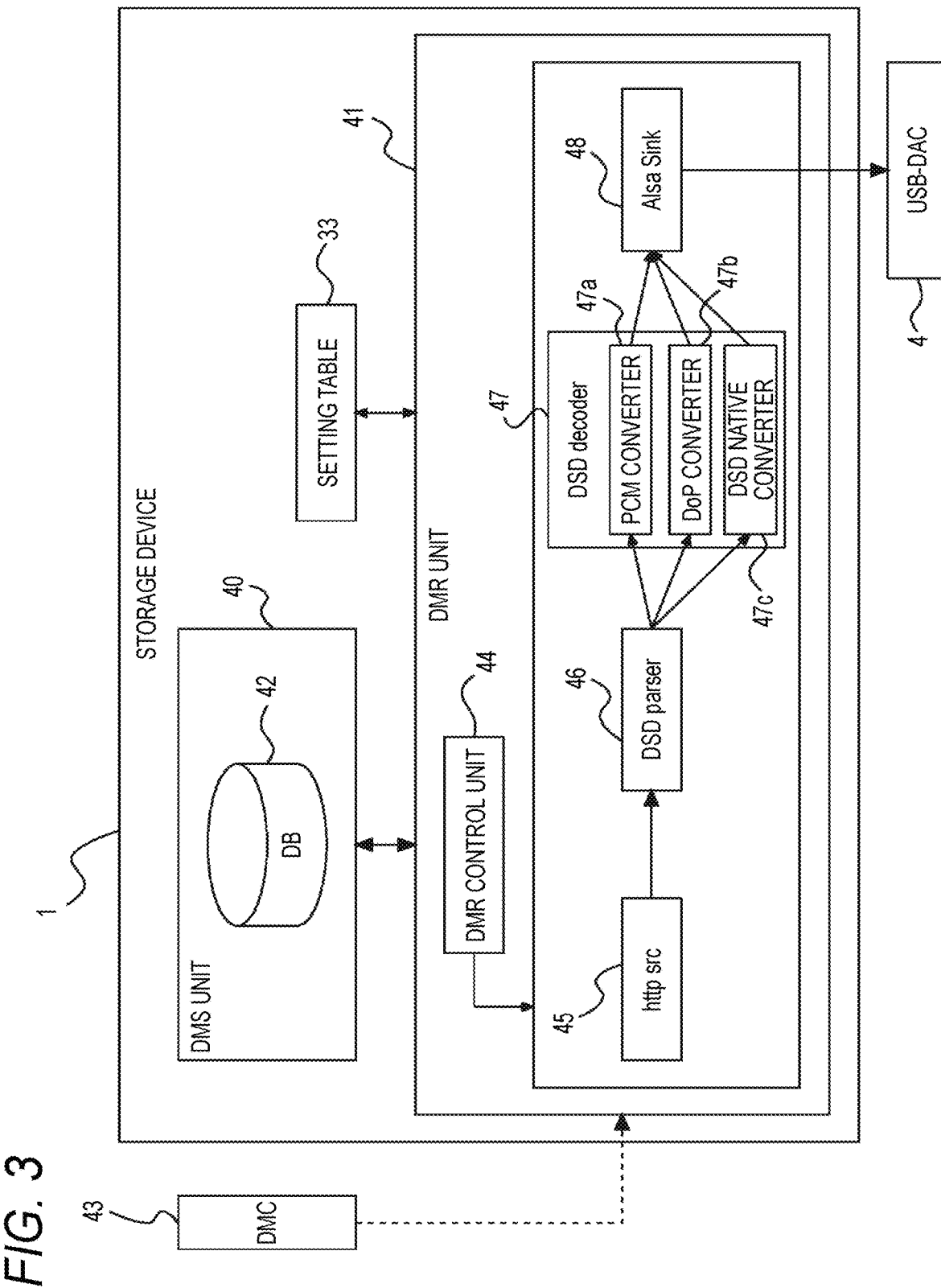
FIG. 3 is a functional block diagram of the storage device according to the first illustrative embodiment to be used during the reproduction of music data having DSD format.

FIG. 3 is a functional block diagram of the storage device according to the illustrative embodiment of the disclosure, adapted for the reproduction of music data having the DSD format. The functional block diagram of FIG. 3 shows functions according to Digital Living Network Alliance (DLNA) (registered as a trade mark) guidelines, and content files 30 are music files having the DSD format.

The storage device 1 of the present illustrative embodiment includes a Digital Media Server (DSM) unit 40 and a Digital Media Renderer (DMR) unit 41 according to the DLNA guidelines. The DLNA guidelines are a standard for establishing a home network using various devices such as AV devices, PCs, and mobile devices. Content files 30 including photos, music, and videos are stored in a DB 42 included in the DMS unit 40, and a content list is managed in a hierarchical folder structure (Content Directory Service (CDS)). Content files 30 which are managed in the CDS have ID values for uniquely identifying the individual content files 30, and Uniform Resource Identifiers (URIs) representing the sources of the content files 30 and metadata which are detailed information on the content files 30. The CDS is disclosed such that other devices on the network can refer to the CDS. A client device capable of reproducing contents selects a content, using the CDS on the DMS unit 40, and acquires the content data represented by the URI of the content from the DB 42 of the DMS unit 40, and reproduces the content data. In this case, as a protocol for communication between the DMS unit 40 and the client device, Hypertext Transfer Protocol (HTTP) can be used For example, a DMC (Digital Media Controller) 43 according to the DLNA guidelines constitutes the communication device 3 which is a type of client device. The DMC (Digital Media Controller) 43 constituting the communication device 3 searches for the DMS unit 40 existing on the network, and acquires CDS information (for example, the content list), and displays a screen for browsing the acquired CDS information. A user browses the content list, and selects a desired content file 30 to be reproduced. The DMR unit 41 requests the DMR unit 41 to reproduce the content file 30 selected by the user. The DMR unit 41 instructs the DMS unit 40 to transmit the content file 30, and reproduces the content data transmitted from the DMS unit 40.

The DMR unit 41 of the disclosure includes a DMR control unit 44, an http src unit 45, a DSD parser unit 46, a DSD decoder unit 47, and an Alsa Sink unit 48. In other words, the DMR unit 41 is composed of some components (for example, the CPU 20, the ROM 21, the RAM 22, and so on) of the storage device 1 shown in FIG. 2.

The DMR control unit 44 receives a content reproduction instruction, and while appropriately referring to the setting table 33, the DMR control unit instructs the http src unit 45, the DSD parser unit 46, the DSD decoder unit 47, and the Alsa Sink unit 48 to perform the following operations, and controls them.

The http src unit 45 receives content files 30 from the DMS unit 40, and outputs the content files 30 to the DSD parser unit 46 at the next stage. The DSD parser unit 46 parses the content files 30 of the DSD format outputted from the http src unit 45. The DSD parser unit 46 outputs the content files in an x-dsd format to one of a PCM converter 47a, a DoP converter 47b, and a DSD native converter 47c included in the DSD decoder unit 47 and determined according to the result of analysis of the headers of the content files 30. The DMR control unit 44 determines one of the converters 47a, 47b, and 47c with reference to the setting table 33, and instructs the DSD parser unit 46 to output the content files to the determined converter.

The DSD decoder unit 47 includes the PCM converter 47a, the DoP converter 47b, and the DSD native converter 47c. The PCM converter 47a decodes input data having the x-dsd format, and outputs data having the PCM format. The DoP converter 47b decodes input data having the x-dsd format, and outputs data having an x-raw (DoP) format. The DSD native converter 47c adds appropriate header data to input data having the x-dsd format, and outputs the data including the header data.

Then, the Alsa Sink unit 48 negotiates with the USB-DAC 4, related to a variety of information on sampling rates, channels, and formats, and transmits the outputs from the DSD decoder unit 47 to the USB-DAC 4.

Now, content files 30 having the DoP (DSD over PCM) format will be described. Each frame of content files 30 having the DoP format is composed of 25 bits. The reason is that the USB standard defines that each frame of data of the PCM format is composed of 24 bits. In data of 24 bits, the high-order 8 bits are assigned to a DSD marker, and has information on a corresponding content file 30 having the DSD format. The low-order 16 bits are DSD audio bits. Content data of the DSD format is sequentially stored from high-order bits in the low-order 16 bits in the DoP format.

FIG. 4 is a block diagram of the storage device 1 according to the present illustrative embodiment. The storage device 1 of the present illustrative embodiment includes a control unit 50, a storage 51, an operation input unit 52, a reproduction output unit 53, and a communicator 54.

The control unit 50 controls the whole of the storage device 1. Particularly, the control unit 50 has the function of controlling the storage device 1 such that the storage device operates as a DMS and a DMR according to the DLNA guidelines as described above. The control unit 50 includes an input unit 55 and a reproducer 56.

The input unit 55 receives instructions to reproduce content files 30 stored in a storing unit 61 (described below) of the storage 51. Reproduction instructions include an instruction to reproduce a content file 30, which is a music file, from its beginning, and an instruction to reproduce a content file 30 from a stop/pause position. The latter instruction is an instruction to reproduce a content file 30 from a stop/pause position after the reproducer 56 has stopped or paused the output of the content file 30 to an external reproducing device in response to a stop/pause instruction received during reproduction of the content file 30.

Further, reproduction instructions include the following instructions. In other words, in the case where content files 30 are stored in an album format in the storing unit 61, that is, a plurality of content files 30 is stored as one reproduction unit, an instruction for reproducing content files stored in the album format is also included in reproduction instructions. In this case, reproduction instructions which the input unit 55 receives include an instruction for reproducing, from the beginning, the music of the content file 30 to be reproduced first within the album, and an instruction for preparing the reproduction of a content file 30 to be reproduced next when ongoing reproduction of the current content file 30 approaches its end.

The reproducer 56 outputs content files 30 to an external reproducing device based on reproduction instructions received by the input unit 55. In the present illustrative embodiment, the reproducer 56 mainly outputs content files 30 to the USB-DAC 4 connected to the USB connector of the storage device 1, but it may output content files to other external reproducing devices. Also, the reproducer 56 may output content files 30 (more specifically, content data) to an external reproducing device, according to the format of the content files 30 and the performance of the external reproducing device, and may convert content files 30 into data having a format reproducible in an external reproducing device, and output the data.

The reproducer 56 includes an acquiring unit 57, a notifier 58, and a data controller 59.

When the USB-DAC 4, which is an external digital-to-analog converter (one example of an external reproducing device) is connected to the USB interface 23c which is an input/output interface, if the USB interface 23c acquires the ID of the USB-DAC 4, the acquiring unit 57 acquires the ID as identification information, and describes the ID of the USB-DAC 4 in the setting table 33. The ID of the USB-DAC 4 means the USB ID of the USB-DAC 4. The USB ID includes a vendor ID and a product ID, and the vendor ID is a unique ID for the manufacturer of the USB device, and the product ID is a unique ID for the USB device assigned by the vendor. Each of the vendor ID and the product ID is a 2-byte value and is a four-digit alphanumeric string expressed in hexadecimal notation using 0 to F. When the USB-DAC 4 is connected to the USB interface 23c, the USB ID can be acquired in the course of the negotiation between the Alsa Sink unit 48 corresponding to the acquiring unit 57 and the USB-DAC 4.

Alternatively, the acquiring unit 57 may acquire one of the vendor ID and the product ID of the USB ID as identification information, and describe the identification information in the setting table 33, or may use a part of the vendor ID or the product ID as identification information. As described above, any unique information capable of identifying the USB-DAC 4 may be used as identification information.

If the input unit 55 receives an instruction to reproduce a content file 30, the notifier 58 notifies reproduction information necessary for the USB-DAC 4 which is an external reproducing device to reproduce the control unit 30 before the content file is outputted to the USB-DAC 4. This reproduction information includes information on the format of the content file 30 to be outputted from the storage device. Also, the reproduction information may include information on the sampling rate and channel related to the content file 30 to be outputted from an electro-acoustic transducer.

In other words, in general, USB-DACs including the USB-DAC 4 which is used in the present illustrative embodiment do not have the function of automatically recognizing the formats of input content files 30 and changing the settings of the USB-DACs. If a device to output a content file 30, for example, the storage device 1 of the present illustrative embodiment notifies reproduction information to the USB-DAC 4 in advance, the USB-DAC 4 receives the reproduction information, and changes its settings.

The notifier 58 notifies reproduction information prior to outputting of content files 30. However, as described above, in the case where content files 30 have the album format, and a plurality of content files 30 to be consecutively reproduced is associated with the same reproduction information, the notifier needs only to notify the reproduction information before the first content file 30 is reproduced.

When the USB-DAC 4 which is an external reproducing device is connected to the storage device 1, the data controller 59 acquires unique identification information for the USB-DAC 4, and outputs to the USB-DAC 4 content files 30 having a data format reproducible in the USB-DAC 4, preferably, a format reproducible in the USB-DAC 4, with reference to the setting table 33. More specifically, the data controller 59 searches the setting table 33 for the USB ID acquired as the identification information of the USB-DAC 4 by the acquiring unit 57, and detects a format associated with the USB ID and reproducible in the USB-DAC 4.

Here, in the case where the corresponding identification information is not in the setting table, the identification information and a reproducible data format may be added to the setting table, or if there is only the corresponding identification information, a reproducible data format may be added.

Then, the data controller 59 outputs to the USB-DAC 4 the content file 30 having the format reproducible in the USB-DAC 4 connected to the data controller.

Preferably, on the basis of the USB ID of the USB-DAC 4, the data controller 59 transmits the content file 30 having the DSD format to the USB-DAC 4, without converting format conversion or after converting the content file into the DoP format or the PCM format. In other words, the data controller 59 detects a format reproducible in the USB-DAC 4 connected thereto, with reference to the setting table 33, and selects one based on the detection result from the PCM converter 47a, the DoP converter 47b, and the DSD native converter 47c included in the DSD decoder unit 47. The selected converter converts the content file 30, and then the data controller 59 outputs the content file to the USB-DAC 4.

Also, the storage device 1 has a PCM port and a DSD port as logical ports. In other words, the storage device 1 has two logical ports (e.g. the PCM port and the DSD port) with respect to one physical port (e.g. the USB interface (I/F) 23c)). According to the format reproducible in the USB-DAC 4, the data controller 59 selects one of the logical ports of the storage device 1 to be used for connection with the USB-DAC 4. The PCM port substantially corresponds to the processes of the PCM converter 47a and the DoP converter 47b, and the DSD port substantially corresponds to the process of the DSD native converter 47c. Therefore, in the case where the format reproducible in the USB-DAC 4 is the PCM format or the DoP format, the data controller 59 determines to use the PCM port for connection with the USB-DAC 4, whereas in the case where the format reproducible in the USB-DAC 4 is the DSD format, the data controller determines to use the DSD port for connection with the USB-DAC 4.

The storage 51 has the function of at least temporarily storing a variety of data. The storage 51 has the storing unit 61, and content files 30 and the content registration list 31 are stored in the storing unit 61 in advance. As described already, content files 30 which can be stored in the storing unit 61 of the storage device 1 of the present illustrative embodiment may preferably include content files 30 having the DSD format. The content registration list 31 includes the file names of the content files and the content information in association with each other. The content information includes the information representing the details of the content data and attribute such as the storage locations for the content files (for example, URIs), content names, content sizes, and the like. Also, in the storage 51, the setting table 33 is stored in advance.

The operation input unit 52 receives a variety of data inputted to the storage device 1, and inputs the variety of input data to the control unit 50 or stores the variety of input data in the storage 51. The reproduction output unit 53 which also functions as a reproducer outputs the content file 30 outputted from the reproducer 56, to the external reproducing device such as the USB-DAC 4. The communicator 54 which also functions as an input unit transmits a variety of data of the control unit 50 and the storage 51 to external output devices including the communication device 3 and the external server 11 through the LAN 8 and the WAN 10. Also, the communicator 54 receives a variety of data from the communication device 3 and the like.

In the above-described configuration, the control unit 50, and the input unit 55 and the reproducer 56 included in the control unit 50 are mainly configured by the CPU 20. The storage 51 is mainly configured by the ROM 21, the RAM 22, and the HDD unit 26. The operation input unit 52 is mainly configured by the input/output device 23. The reproduction output unit 53 is mainly configured by the input/output device 23. The communicator 54 is mainly configured by the network interface 25. The operations of the individual functional units of the storage device 1 shown in FIG. 4 will be described below in detail.

(Configuration of Setting Table)

FIG. 5 illustrates the setting table 33 applicable to the storage device 1 according to the present illustrative embodiment.

As described above, the setting table 33 of the present illustrative embodiment is stored in the storage 51 of the storage device 1 in advance. The setting table 33 has a USB ID area 33a and a DSD reproduction ability area 33b.

In the USB ID area 33a, the USB IDs of USB-DACs 4 which may be connected to the storage device 1 are stored in advance. In the DSD reproduction ability area 33b, information representing whether each of the USB-DACs 4 specified by the USB IDs described in the USB ID area 33a can reproduce content files 30 having the DSD format is described in advance. Each item of this information is one of the following information items. One item represents that a corresponding USB-DAC cannot perform DSD reproduction and can reproduce only content files 30 having the PCM format, and is shown by "NO" in FIG. 5. Another item represents that a corresponding USB-DAC can reproduce content files 30 having the DoP format, and is shown by "DoP" in FIG. 5. The other item represents that a corresponding USB-DAC can reproduce content files 30 having the DSD format, and is shown by "Native" in FIG. 5.

Here, some USB-DACs 4 capable of reproducing content files 30 having the DSD format can reproduce content files 30 having the PCM format or the DoP format. However, the storage device 1 of the present illustrative embodiment retains at least the content files 30 having the DSD format, and if content files 30 having the DSD format are converted into the PCM format or the DoP format, the audio quality may change. For this reason, it is preferable that USB-DACs 4 capable of reproducing content files 30 having the DSD format reproduce content files having the DSD format without performing format conversion, that is, in the DSD native environment if it's possible. Therefore, in the DSD reproduction ability area 33b, information on whether it is possible to reproduce the DSD format is preferentially described.

Similarly, since content files 30 having the DoP format have data structures based on the PCM format, and are content files 30 including data of the DSD format in an almost intact state, if it is possible to reproduce content files 30 having the DoP format, information representing that is preferentially described.

(Operation of First Illustrative Embodiment)

Figure 7:
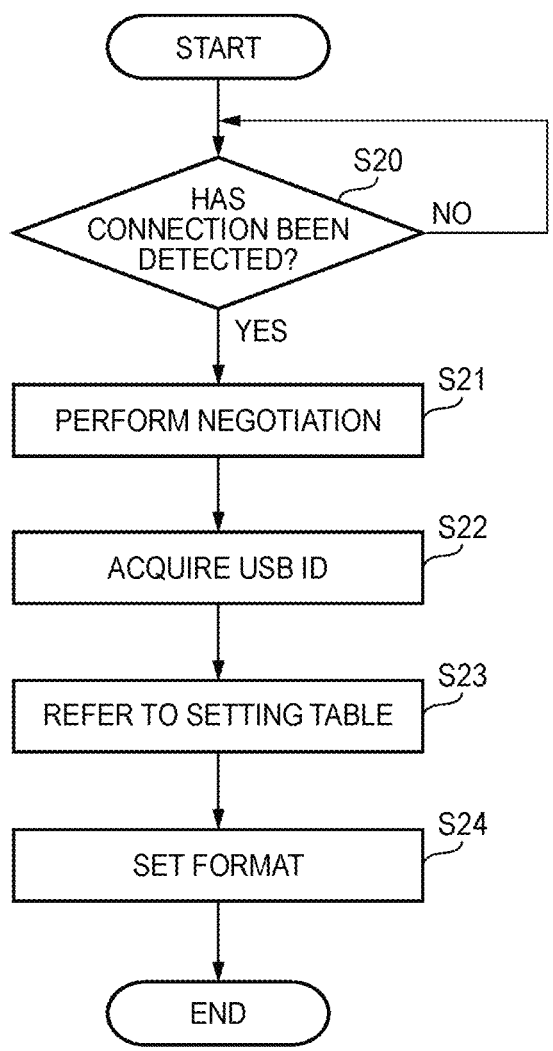
FIG. 7 is a flow chart for explaining the operation of the storage device according to the first illustrative embodiment.
Figure 8:
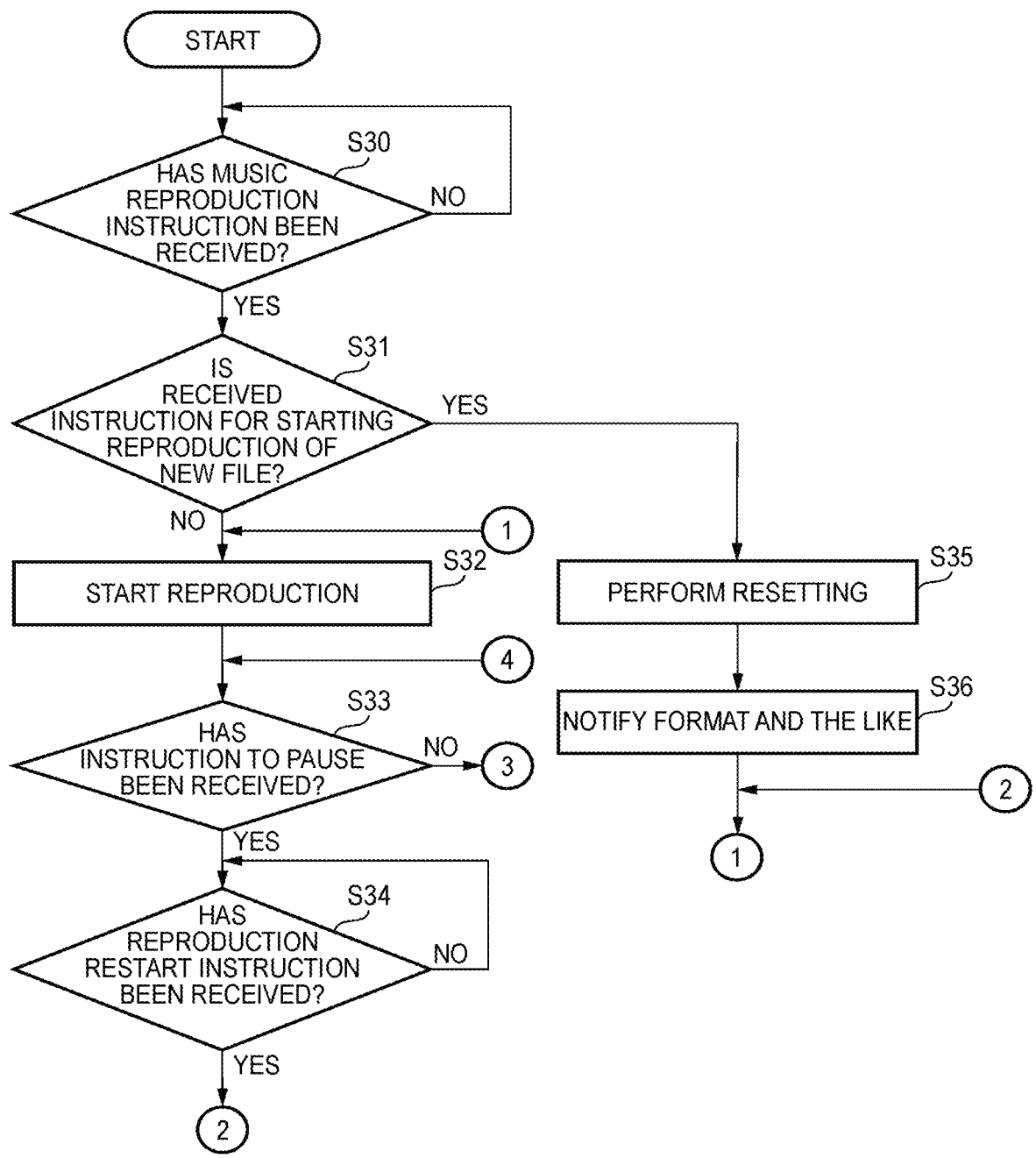
FIG. 8 is another flow chart for explaining the operation of the storage device according to the first illustrative embodiment.
Figure 9:
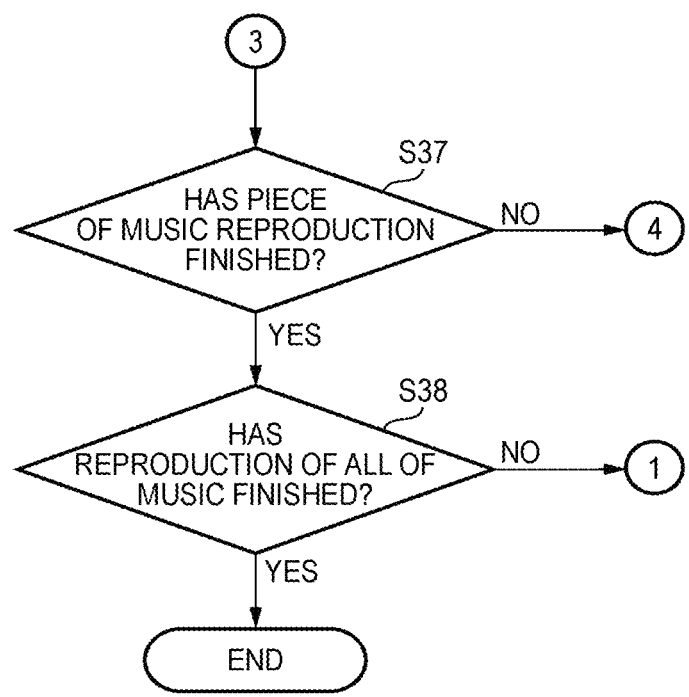
FIG. 9 is a flow chart for explaining the operation of the storage device according to the first illustrative embodiment, as an additional part of FIG. 8.

Now, the operation of the content reproducing system S of the present illustrative embodiment will be described while focusing on the operation of the storage device 1 with reference to the sequence diagram of FIG. 6 and the flow charts of FIGS. 7 to 9.

Figure 6:
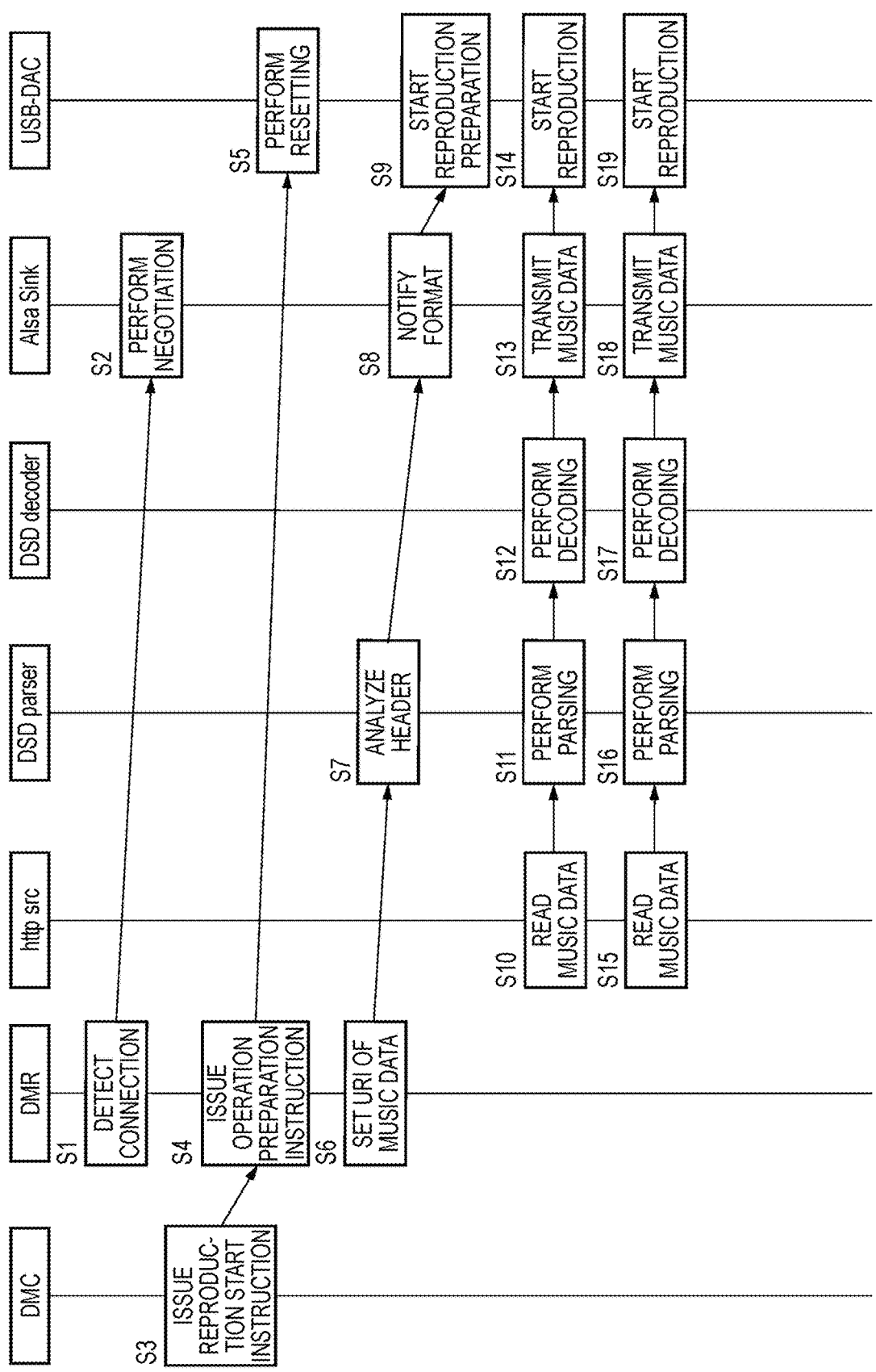
FIG. 6 is a sequence diagram for explaining an example of an operation of the storage device according to the first illustrative embodiment.

First, FIG. 6 is a sequence diagram for explaining an example of the operation of the storage device according to the first illustrative embodiment. The sequence diagram of FIG. 6 illustrates an operation at start of reproduction of a content file 30 of the DSD format.

First, in STEP S1, the DMR control unit 44 of the DMR unit 41 detects that a USB-DAC 4 is connected to the USB interface 23c. Subsequently, in STEP S2, the Alsa Sink unit 48 performs a negotiation operation based on the USB standard with the USB-DAC 4. At this time, the Alsa Sink unit 48 acquires the USB ID of the USB-DAC 4.

Subsequently, if the communication device 3 which is a DMC issues an instruction to reproduce a content file 30 having the DSD format, in STEP S4, the DMR control unit 44 of the DMR unit 41 issues an operation preparation instruction to the http src unit 45, the DSD parser unit 46, the DSD decoder unit 47, and the Alsa Sink unit 48 (hereinafter, referred to generally as the pipeline of the DMR unit 41). If the pipeline of the DMR unit 41 becomes the operation preparation state, in STEP S5, the USB-DAC 4 resets itself.

In STEP S6, according to control of the DMR control unit 44, the http src unit 45 sets the URI of the reception object music file (the content file 30), and in STEP S7, the DSD parser unit 46 analyzes the header part of the content file 30 which is the object of the reproduction instruction, thereby acquiring its sampling rate. In STEP S8, the Alsa Sink unit 48 notifies the USB-DAC 4 of the sampling rate acquired in STEP S7 by the DSD parser unit 46, and a channel and a format acquired by data exchange with the DMC 43. In STEP S9, according to the sampling rate and the like obtained in STEP S8 by the negotiation with the Alsa Sink unit 48, the USB-DAC 4 starts preparing for the operation of reproducing the content file 30 which is the object of the reproduction instruction.

In STEP S10, the http src unit 45 reads out the content file 30 from the DMS unit 40. In STEP S11, the DSD parser unit 46 parses the content file 30. In STEP S12, the DSD decoder unit 47 decodes the music data. Then, in STEP S13, the Alsa Sink unit 48 transmits the music data to the USB-DAC 4. In STEP S14, the USB-DAC 4 starts to reproduce the music data. Thereafter, as shown in STEP S15 to STEP S19, the operation from reading of the next music data to reproduction of the next music data is repeated.

Now, the operation of the storage device 1 of the present illustrative embodiment will be described with reference to the flow charts of FIGS. 7 to 9.

First, with reference to the flow chart of FIG. 7, the operation which is performed when a USB-DAC 4 is connected to the storage device 1 of the present illustrative embodiment will be described.

In STEP S20, the acquiring unit 57 of the reproducer 56 continues a standby operation until it is detected that any USB-DAC 4 is connected to the USB device 32. If a connection between the USB interface 23c and a USB-DAC 4 is detected ("YES" in STEP S20), in STEP S21, the acquiring unit 57 performs a negotiation operation based on the USB standard with the USB-DAC 4. In STEP S22, the acquiring unit 57 acquires the USB ID of the USB-DAC 4 by the negotiation operation of STEP S21.

In STEP S23, the data controller 59 determines whether the same USB ID as the USB ID acquired in STEP S22 is described in the USB ID area 33a of the setting table 33. If the USB ID is described, information described in the DSD reproduction ability area 33b in association with the USB ID is extracted. Then, in STEP S24, according to the information described in the DSD reproduction ability area 33b, a format to be obtained as a result of data conversion of the data controller 59 is set.

This is setting of a decoding operation using one of the PCM converter 47a, the DoP converter 47b, and the DSD native converter 47c included in the DSD decoder unit 47 of FIG. 3.

Now, with reference to the flow charts of FIG. 8 and FIG. 9, the operation of reproducing music data of the storage device 1 of the present illustrative embodiment will be described.

In STEP S30, the input unit 55 waits for an instruction to reproduce a content file 30 which is a music file to be input from the communication device 3 through the communicator 54. If the input unit 55 receives a reproduction instruction, the program proceeds to STEP S31.

In STEP S31, whether any content file 30 is being reproduced is determined. In other words, the data controller 59 determines whether the reproduction instruction received in STEP S30 by the input unit 55 is an instruction to start reproduction of a content file 30. If the determination result is "YES", the program proceeds to STEP S35, whereas if the determination result is "NO", the program proceeds to STEP S32. In other words, in the case where the data controller 59 determines in STEP S31 that the reproduction instruction received in STEP S30 by input unit 55 is an instruction to start reproduction of a new content file 30, the program proceeds to STEP S35, whereas in the case where the data controller 59 determines that the reproduction instruction received in STEP S30 by input unit 55 is an instruction to start reproduction of a paused content file 30, the program proceeds to STEP S32.

In STEP S32, the reproduction output unit 53 outputs the content file 30 which is the object of the reproduction instruction, to the USB-DAC 4 which is an external reproducing device, such that the content file 30 starts to be reproduced.

In STEP S33, it is determined whether the input unit 55 has received an instruction to pause the current reproduction object content file 30 from the communication device 3 through the communicator 54. If the determination result is "YES", the program proceeds to STEP S34, whereas if the determination result is "NO", the program proceeds to STEP S37.

In STEP S34, the input unit 55 waits for an instruction to restart reproduction of the content file 30 to be input from the communication device 3 through the communicator 54.

If the input unit 55 receives a reproduction restart instruction, the program proceeds to STEP S32.

In STEP S35, the data controller 59 resets the whole of the reproduction output unit 53, and in STEP S36, the notifier 58 notifies the format, sampling rate, and the like of the content file 30 to the USB-DAC 4 which is an external reproducing device. Then, the program proceeds to STEP S32.

In STEP S37, it is determined whether the reproducer 56 has finished the reproduction of the current reproduction object content file 30. If the determination result is "YES", the program proceeds to STEP S38, whereas if the determination result is "NO", the program proceeds to STEP S33. In STEP S38, it is determined whether reproduction of the whole of the content file 30 which is the object of the reproduction instruction received in STEP S30 has finished. In other words, it is determined whether reproduction of all of content files 30 which are consecutive reproduction objects in an album format has finished. If the determination result is "YES", the program finishes, whereas if the determination result is "NO", the program returns to STEP S32.

(Effects of First Illustrative Embodiment)

As described above, in the storage device 1 of the present illustrative embodiment, the data controller 59 acquires a format reproducible in a USB-DAC 4 by referring to the setting table 33 on the basis of the USB ID of the USB-DAC 4, and converts content files 30 into the reproducible format, and then outputs the content files 30 to the USB-DAC 4. Therefore, unlike storage devices of the related art, even though a USB-DAC is connected to the USB interface of the storage device, it is unnecessary to manually set a music data format reproducible in the connected USB-DAC. In other words, the storage device 1 automatically sets a reproducible format.

Therefore, according to the present illustrative embodiment, the storage device can easily output content files 30 having a format appropriate for a USB-DAC 4 connected to the storage device.

Second Illustrative Embodiment

Figure 10:
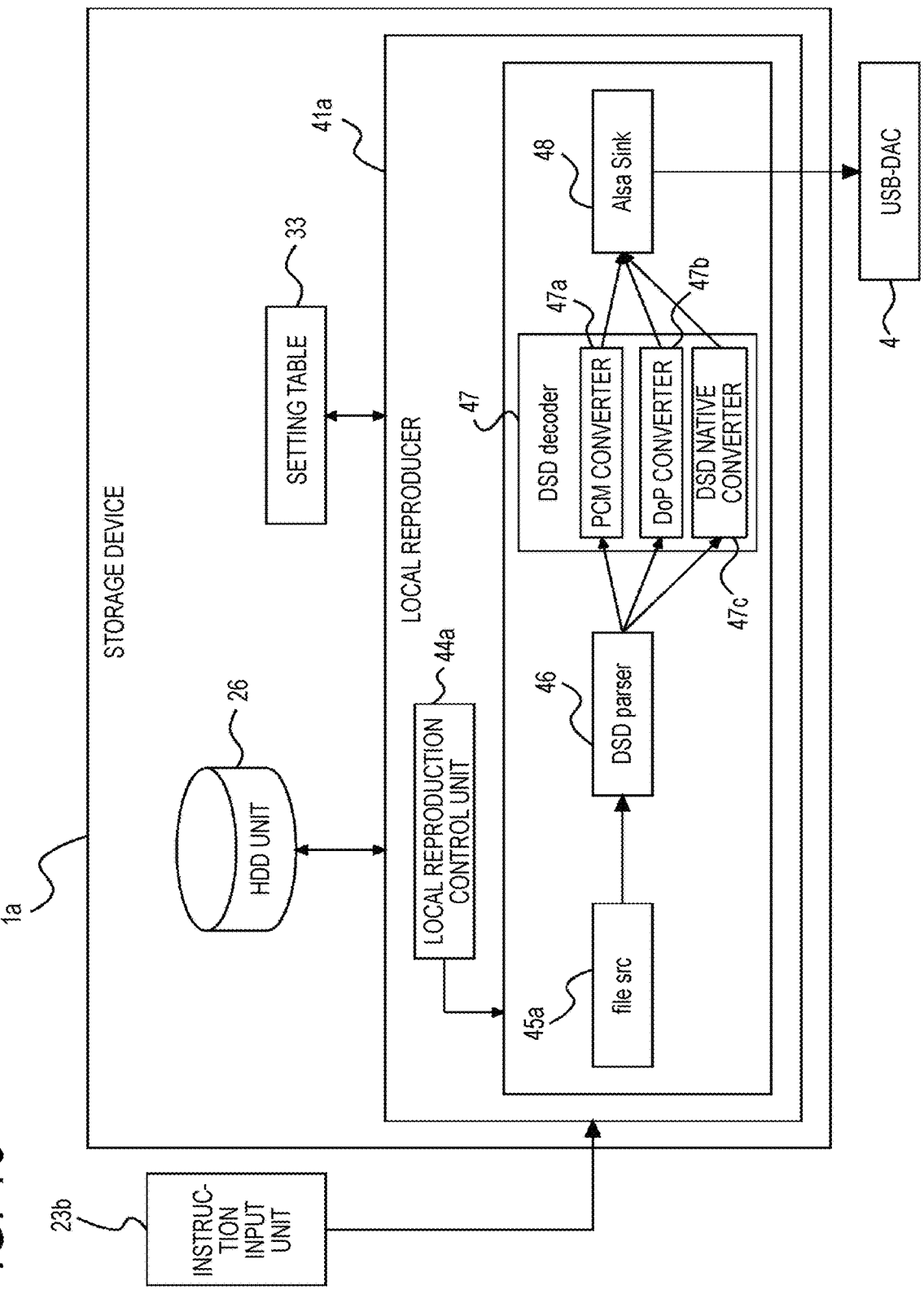
FIG. 10 is a functional block diagram of a storage device according to a second illustrative embodiment of the disclosure.

FIG. 10 is a functional block diagram of a storage device according to a second illustrative embodiment of the disclosure to be used during reproduction of music data having the DSD format. Also, components identical to those of the storage device of the first illustrative embodiment are denoted by the same reference symbols, and will be described in brief.

In the storage device of the first illustrative embodiment described above, since content files 30 which are music data are reproduced according to the DLNA guidelines, content files 30 are managed by the CDS. To this end, various parameters for reproducing music data according to the DLNA guidelines are stored in the DB 42 in advance.

Meanwhile, in a mode in which reproduction of content files 30 is directly instructed via the input interface 23a of the storage device 1, the storage device 1 does not need to operate according to the DLNA guidelines, and needs only to output content files 30 to a USB-DAC 4 by a simple file reproducing operation. A storage device 1a of the present illustrative embodiment performs this operation.

In the storage device 1a of the present illustrative embodiment, a local reproducer 41a configured to perform a file reproducing operation directly accesses the HDD unit 26. If the instruction input unit 23b issues an instruction to reproduce content files 30 stored in the HDD unit 26, the local reproducing unit 41a reproduces the content files 30. The CDS and metadata may not be stored in the HDD unit 26, and in a configuration in which one of the storage device 1a of the present illustrative embodiment and the storage device 1 of the first illustrative embodiment operates, the CDS and the like may be stored in the HDD unit 26 in advance.

The local reproducer 41a of the present illustrative embodiment includes a local reproduction control unit 44a, a file src unit 45a, a DSD parser unit 46, a DSD decoder unit 47, and an Alsa Sink unit 48.

If an instruction to reproduce content files 30 is inputted from the instruction input unit 23b to the local reproduction control unit 44a, the local reproduction control unit instructs the file src unit 45a, the DSD parser unit 46, the DSD decoder unit 47, and the Alsa Sink unit 48 to perform the following operation, and controls them. According to the reproduction instruction of the instruction input unit 23b, the file src unit 45a reads out the content files 30 from the HDD unit 26, and outputs the content files 30 to the DSD parser unit 46.

Therefore, even according to the present illustrative embodiment, similarly to the storage device 1 of the first illustrative embodiment described above, the storage device 1a can easily output content files 30 having a format appropriate for a USB-DAC 4 connected thereto.

(Modifications)

The details of the storage device 1 of the disclosure are not limited to the above-described illustrative embodiments, and can be modified in various forms. As an example, according to the first and second illustrative embodiments, the setting table 33 including the USB IDs of USB-DACs 4 and information representing whether each of the USB-DACs can reproduce DSD files is stored in the storage device 1 in advance. However, in the case where new USB-DACs 4 are sold, or in the case where data on whether USB-DACs 4 already sold can reproduce DSD files is updated, the data controller 59 of the storage device 1 may appropriately access the external server 11 on the WAN 10, and acquire the update data, and update the contents of the setting table 33 with the acquired data. Alternatively, the setting table 33 may be stored in the external server 11 such that whenever a USB-DAC 4 is connected, the data controller 59 can refer to the setting table 33 stored in the external server 11.

Also, in the storage device 1 of each illustrative embodiment described above, in the case where the notifier 58 notifies a format, a sampling rate, and the like to a USB-DAC 4, the USB-DAC 4 changes its settings according to the notification. It takes a certain length of time to complete the change of the settings. Therefore, if the data controller 59 outputs a content file 30 to a USB-DAC 4 immediately after the notifier 58 performs notification, the USB-DAC 4 receives the content file 30 before completing preparation necessary to reproduce the content file 30. As a result, the leading part of the content file 30 may not be reproduced.

In order to prevent this problem, the data controller 59 may output soundless data for a period equal to or longer than the time necessary to change the settings. The time necessary for a USB-DAC 4 to change its settings may depend on the USB-DAC 4. For this reason, the period for which the data controller 59 outputs soundless data may be described in the above-described setting table 33, such that in the case of reproducing a content file 30, the data controller 59 outputs predetermined soundless data with reference to the setting table 33.

Further, in the above-described illustrative embodiments, the data controller 59 performs format conversion according to the information described in the setting table 33. However, how to determine whether to perform format conversion and which format content files should be converted into may be switched between a mode based on the setting table 33 and a mode according to user's direct determination. In other words, an automatic mode for automatically performing format conversion and a manual mode for performing format conversion according to user's determination may be switched.

Also, although the storage device of the above-described illustrative embodiments has the instruction input unit 23b, the storage device may have a display unit for displaying information (for example, music titles) related to content files 30. Also, the display unit may have a touch panel such that the touch panel functions as the input unit of the disclosure. In other words, the display unit may receive instructions to reproduce content files 30.

Also, the disclosure can be applied to a reproduction process device configured to receive instructions to reproduce content data stored in an external storage device and output the content data to the external reproducing device according to the received reproduction instructions.

In the above-described illustrative embodiments, the programs executable in the storage device are stored in and provided from the ROM 21, the HDD unit 26, and the like. However, the programs may be loaded into the storage device 1 from a recording medium such as a Digital Versatile Disc (DVD), a USB flash memory device, or a memory card if the recording medium is connected to an optical disk drive (not shown in the drawings), the USB interface 23c, or the like, and be executed in the storage device 1. Also, the programs may be stored in the external server 11 on the WAN 10, such that it is possible to load the programs into the storage device 1 through the network interface 25 and execute the programs in the storage device. Also, in each illustrative embodiment described above, the storage device 1 is configured by a plurality of hardware components. However, the CPU 20 may implement operations of some of the hardware components by executing programs. Further, in each illustrative embodiment described above, the HDD unit 26 is used. However, a well-known storage medium other than the HDD unit 26 (such as a Solid State Drive (SSD) device or a memory card) can also be used.

What is claimed is:

1. A storage device comprising:
a memory configured to retain content data and a table, the table including identification information of an external reproducing device and data format information of the content data reproducible in the external reproducing device in association with each other, the data format information identifying Direct Stream Digital (DSD) format, DSD over Pulse Code Modulation (PCM) (DoP) format, and a PCM format: and
circuitry configured to:
receive reproduction instruction to reproduce the content data stored in the memory;
notify the external reproducing device of the data format information of the content data reproducible in the external reproducing device, in advance to outputting the content data to the external reproducing device, the external reproducing device recognizing the data format of the content data based on the data format information sent from the storage device; and
output the content data to the external reproducing device according to the reproduction instruction,
wherein, when the external reproducing device is connected to the storage device, the circuitry is configured to acquire unique identification information for the external reproducing device, and determine whether the data format of the content data reproducible in the external reproducing device is the DSD format based on the table,
wherein the circuitry is configured to specify the data format as the DSD format in case that the data format of the content data reproducible in the external reproducing device is the DSD format,
wherein the circuitry is configured to convert data format of the content data into the data format reproducible in the external reproducing device by referring to the table, based on a priority of data format in order of the DoP format and the PCM format, in case that the data format of the content data reproducible in the external reproducing device is not the DSD format.

2. The storage device according to claim 1, further comprising:
an input/output interface based on a Universal Serial Bus (USB) standard,
wherein, when the external reproducing device is connected to the input/output interface, the input/output interface acquires an ID of the external reproducing device, and the circuitry acquires the ID as the identification information, and updates the identification information in the table.

3. The storage device according to claim 1,
wherein the content data stored in the storage has the DSD format, and
wherein according to the identification information of the external reproducing device, the circuitry outputs the content data having the DSD format to the external reproducing device, without performing format conversion, or converts the content data into the DoP format or the PCM format and then outputs the content data to the external reproducing device.

4. The storage device according to claim 3, further comprising:
a PCM port and a DSD port, that are logical ports,
wherein, according to the data format reproducible in the external reproducing device, the circuitry determines one of the logical ports to be used for connection with the external reproducing device.

5. The storage device according to claim 1, wherein:
the circuitry accesses an external server, acquires update information, and updates the contents of the table with the acquired update information.

6. The storage device according to claim 1,
wherein the content data is music data, and
wherein the circuitry is further configured to set predetermined time of soundless data corresponding to the external reproducing device in the table, and output the soundless data for the predetermined time in advance to the content data based on the table, until the external reproducing device is ready to reproduce the content data.

7. The storage device according to claim 1,
wherein the circuitry is further configured to set a first mode of converting data format based on the table and a second mode of converting data format based on a user command, and
wherein the circuitry is further configured to switch modes from the first mode to the second mode, or from the second mode to the first mode.

8. A data output method for a storage device having circuitry and a memory, the memory configured to retain content data and a table, the table including identification information of an external reproducing device and data format information of the content data reproducible in the external reproducing device in association with each other, the data format information identifying Direct Stream Digital (DSD) format, DSD over Pulse Code Modulation (PCM) (DoP) format, and a PCM format, the method comprising:

receiving reproduction instruction to reproduce the content data stored in the memory;

notifying the external reproducing device of the data format information of the content data reproducible in the external reproducing device, in advance to outputting the content data to the external reproducing device, the external reproducing device recognizing the data format of the content data based on the data format information sent from the storage device; and outputting the content data to the external reproducing device according to the reproduction instruction, wherein, when the external reproducing device is connected to the storage device, the circuitry is configured to acquire unique identification information for the external reproducing device, and determine whether the data format of the content data reproducible in the external reproducing device is the DSD format based on the table, wherein the circuitry is configured to specify the data format as the DSD format in case that the data format of the content data reproducible in the external reproducing device is the DSD format, wherein the circuitry is configured to convert data format of the content data into the data format reproducible in the external reproducing device by referring to the table, based on a priority of data format in order of the DoP format and the PCM format, in case that the data format of the content data reproducible in the external reproducing device is not the DSD format.

9. A reproduction process device comprising:

a memory; and circuitry configured to:

communicate with an external server through a network, the external server having a table including identification information of an external reproducing device and data format information of the content data reproducible in the external reproducing device in association with each other, the data format information identifying Direct Stream Digital (DSD) format, DSD over Pulse Code Modulation (PCM) (DoP) format, and a PCM format;

receive reproduction instruction to reproduce content data;

receive notification from the external server, the notification including the data format information of the content data reproducible in the external reproducing device, in advance to outputting the content data to the external reproducing device, the external reproducing device recognizing the data format of the content data based on the data format information sent from the reproduction process device; and output the content data to the external reproducing device according to the reproduction instruction, wherein, when the external reproducing device is connected to the reproduction process device, the circuitry is configured to acquire unique identification information for the external reproducing device, and determine whether the data format of the content data reproducible in the external reproducing device is the DSD format based on the table, wherein the circuitry is configured to specify the data format as the DSD format in case that the data format of the content data reproducible in the external reproducing device is the DSD format, wherein the circuitry is configured to convert data format of the content data into the data format reproducible in the external reproducing device by referring to the table stored in the external server, based on a priority of data format in order of the DoP format and the PCM format, in case that the data format of the content data reproducible in the external reproducing device is not the DSD format.

10. The reproduction process device according to claim 9, wherein the content data is stored in an external storage device, wherein the circuitry is configured to communicate with the external storage device through the network, wherein the circuitry is configured to acquire the content data stored in the external storage device, and output the content data to the external reproducing device, wherein when the circuitry receives the reproduction instruction to reproduce the content data stored in the external storage device, notifies the reproduction information necessary for the external reproducing device to reproduce the content data before the circuitry acquires the content data from the external storage device and outputs the content data to the external reproducing device, and wherein when the external reproducing device is connected to the reproduction process device, the circuitry acquires the unique identification information for the external reproducing device, and converts the content data into the data format reproducible in the external reproducing device by referring to the table stored in the external server, and outputs the content data to the external reproducing device.

11. The reproduction process device according to claim 10, wherein the content data stored in the external server has the DSD format, and wherein according to the identification information of the external reproducing device, the circuitry outputs the content data having the DSD format to the external reproducing device, without performing format conversion, or converts the content data into the DoP format or the PCM format and then outputs the content data to the external reproducing device.

12. The reproduction process device according to claim 11, further comprising:

an input/output interface based on a Universal Serial Bus (USB) standard, wherein, when the external reproducing device is connected to the input/output interface, the input/output interface acquires an ID of the external reproducing device, and the circuitry acquires the ID as the identification information, and sets which data format the circuitry should perform conversion into, according to the information described in the table.

13. The reproduction process device according to claim 11, further comprising:

a PCM port and a DSD port that are logical ports, wherein, according to the data format reproducible in the external reproducing device, the circuitry determines one of the logical ports to be used for connection with the external reproducing device.

14. The reproduction process device according to claim 9, wherein the content data is stored in the memory, and
wherein the circuitry is configured to acquire the content data stored in the memory and output the content data to the external reproducing device.

15. The reproduction process device according to claim 14, further comprising:
an input/output interface that is based on a Universal Serial Bus (USB) standard,
wherein the circuitry is further configured to, when the input/output interface acquires an ID of the external reproducing device after the external reproducing device is connected to the input/output interface, acquire the ID as the identification information and update the identification information in the table.

16. The reproduction process device according to claim 14,
wherein the content data stored in the memory has the DSD format, and
wherein according to the identification information of the external reproducing device, the circuitry outputs the content data having the DSD format to the external reproducing device, without performing format conversion, or converts the content data into the DoP format or the PCM format and then outputs the content data to the external reproducing device.

17. The reproduction process device according to claim 16, further comprising:
a PCM port and a DSD port that are logical ports,
wherein, according to the data format reproducible in the external reproducing device, the circuitry determines one of the logical ports to be used for connection with the external reproducing device.

18. The reproduction process device according to claim 9, wherein the content data is music data; and
wherein the circuitry is further configured to set predetermined time of soundless data corresponding to the external reproducing device in the table, and output the soundless data for the predetermined time in advance to the content data based on the table, until the external reproducing device is ready to reproduce the content data.

19. The reproduction process device according to claim 9,
wherein the circuitry is further configured to set a first mode of converting data format based on the table and a second mode of converting data format based on a user command, and
wherein the circuitry is further configured to switch modes from the first mode to the second mode, or from the second mode to the first mode.

* * * * *